US010540404B1

(12) United States Patent
Dang et al.

(10) Patent No.: US 10,540,404 B1
(45) Date of Patent: Jan. 21, 2020

(54) FORMING A DOCUMENT COLLECTION IN A DOCUMENT MANAGEMENT AND COLLABORATION SYSTEM

(71) Applicant: Amazon Technologies, Inc., Reno, NV (US)

(72) Inventors: Wei Lien Stephen Dang, Mountain View, CA (US); Arun Ponniah Sethuramalingam, San Jose, CA (US); Cynthia Zhang Taylor, San Leandro, CA (US); Catherine Emily Harrell, San Francisco, CA (US); Nandhini Nandiwada Santhanam, San Jose, CA (US); Stephen Joseph Oakley, Mountain View, CA (US); Sharad Kala, Sunnyvale, CA (US); Noah Anthony Eisner, Menlo Park, CA (US); Liangliang Wang, Foster City, CA (US); Nagesh Pradhan Cadabam, Sunnyvale, CA (US); Kevin Gillett, Menlo Park, CA (US); Himanshu Khurana, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/175,898

(22) Filed: Feb. 7, 2014

(51) Int. Cl.
  *G06F 16/28* (2019.01)
  *G06F 16/93* (2019.01)
  *G06F 21/62* (2013.01)

(52) U.S. Cl.
  CPC ........... *G06F 16/93* (2019.01); *G06F 16/285* (2019.01); *G06F 21/6209* (2013.01)

(58) Field of Classification Search
  CPC ........ G06F 17/30722; G06F 17/30705–30713; G06F 21/30–43; G06F 21/6218–629; G06F 16/285; G06F 16/6209
  See application file for complete search history.

(56) References Cited

U.S. PATENT DOCUMENTS

| 5,251,315 A | 10/1993 | Wang |
| 5,577,188 A | 11/1996 | Zhu |

(Continued)

FOREIGN PATENT DOCUMENTS

| JP | H10240220 A | 9/1998 |
| JP | 2003067330 A | 3/2003 |

(Continued)

OTHER PUBLICATIONS

International Search Report and Written Opinion dated Aug. 28, 2015, International Patent Application No. PCT/US2015/014911, filed Feb. 6, 2015.

(Continued)

*Primary Examiner* — Robert W Beausoliel, Jr.
*Assistant Examiner* — Nirav K Khakhar
(74) *Attorney, Agent, or Firm* — Davis Wright Tremaine LLP

(57) ABSTRACT

A method and apparatus for forming a collection of documents is disclosed. In the method and apparatus, a plurality of documents are identified for inclusion in a document collection. The documents are identified based at least in part on one or more attributes of at least one document of the plurality of documents. A user is requested to confirm the document collection, and an instruction is received from the user indicating one or more documents of the plurality of documents may be included in the document collection. After the indication is received, the collection may be formed and made available to the user or one or more other users of a document management and collaboration system.

20 Claims, 8 Drawing Sheets

(56) References Cited

U.S. PATENT DOCUMENTS

| | | | |
|---|---|---|---|
| 5,596,754 A * | 1/1997 | Lomet | G06F 9/526 |
| | | | 707/E17.007 |
| 5,832,470 A * | 11/1998 | Morita | G06F 17/3071 |
| 5,878,398 A * | 3/1999 | Tokuda | G06Q 10/0631 |
| | | | 379/100.08 |
| 5,911,140 A | 6/1999 | Tukey et al. | |
| 5,991,713 A * | 11/1999 | Unger | H03M 7/3084 |
| | | | 704/1 |
| 6,314,425 B1 | 11/2001 | Serbinis et al. | |
| 6,397,205 B1 * | 5/2002 | Juola | G06F 17/30011 |
| 6,442,555 B1 * | 8/2002 | Shmueli | G06F 17/3071 |
| 6,505,195 B1 * | 1/2003 | Ikeda | G06F 17/30707 |
| 6,553,365 B1 * | 4/2003 | Summerlin | G06F 17/2785 |
| | | | 707/740 |
| 6,687,876 B1 | 2/2004 | Schilit et al. | |
| 6,687,878 B1 | 2/2004 | Eintracht et al. | |
| 6,725,239 B2 | 4/2004 | Sherman et al. | |
| 6,763,346 B1 | 7/2004 | Nishida et al. | |
| 7,177,886 B2 | 2/2007 | Pruet | |
| 7,882,110 B2 | 2/2011 | Bahr | |
| 8,429,753 B2 | 4/2013 | Skaria et al. | |
| 8,527,461 B2 | 9/2013 | Ducott et al. | |
| 8,655,950 B2 | 2/2014 | Scherpa et al. | |
| 8,825,502 B2 | 9/2014 | Bormann et al. | |
| 8,843,494 B1 | 9/2014 | Sampson | |
| 8,938,669 B1 | 1/2015 | Cohen | |
| 9,020,893 B2 | 4/2015 | Zalpuri et al. | |
| 9,047,368 B1 * | 6/2015 | Cooley | G06F 17/30705 |
| 9,106,687 B1 | 8/2015 | Sawhney et al. | |
| 9,208,153 B1 | 12/2015 | Zaveri et al. | |
| 9,449,182 B1 | 9/2016 | Dang et al. | |
| 10,257,196 B2 | 4/2019 | Dang et al. | |
| 2001/0042085 A1 * | 11/2001 | Peairs | G06F 17/30707 |
| | | | 715/200 |
| 2002/0138529 A1 * | 9/2002 | Yang-Stephens | |
| | | | G06F 17/30705 |
| | | | 715/256 |
| 2003/0061221 A1 * | 3/2003 | Ito | G06F 17/30011 |
| 2003/0074368 A1 | 4/2003 | Schuetze et al. | |
| 2004/0068697 A1 * | 4/2004 | Harik | G06F 17/30616 |
| | | | 715/234 |
| 2004/0205542 A1 | 10/2004 | Bargeron et al. | |
| 2004/0210833 A1 | 10/2004 | Lerner et al. | |
| 2004/0230577 A1 * | 11/2004 | Kawatani | G06F 17/3071 |
| 2004/0267746 A1 | 12/2004 | Marcjan et al. | |
| 2005/0010799 A1 | 1/2005 | Kelley et al. | |
| 2005/0022106 A1 * | 1/2005 | Kawai | G06F 17/30705 |
| | | | 715/233 |
| 2005/0034062 A1 | 2/2005 | Bufkin et al. | |
| 2005/0038787 A1 | 2/2005 | Cheung et al. | |
| 2005/0044494 A1 | 2/2005 | Barnes et al. | |
| 2005/0055306 A1 | 3/2005 | Miller et al. | |
| 2005/0160356 A1 | 7/2005 | Albornoz et al. | |
| 2005/0240580 A1 | 10/2005 | Zamir et al. | |
| 2005/0251675 A1 | 11/2005 | Marcjan et al. | |
| 2006/0053365 A1 | 3/2006 | Hollander et al. | |
| 2006/0125846 A1 | 6/2006 | Springer et al. | |
| 2006/0150079 A1 | 7/2006 | Albornoz et al. | |
| 2006/0183462 A1 | 8/2006 | Kolehmainen | |
| 2006/0248083 A1 | 11/2006 | Sack et al. | |
| 2006/0294311 A1 | 12/2006 | Fu et al. | |
| 2007/0118795 A1 | 5/2007 | Noyes et al. | |
| 2007/0150802 A1 | 6/2007 | Wan et al. | |
| 2007/0156732 A1 | 7/2007 | Surendran et al. | |
| 2007/0208994 A1 | 9/2007 | Reddel et al. | |
| 2007/0271249 A1 | 11/2007 | Cragun et al. | |
| 2008/0040342 A1 * | 2/2008 | Hust | G06F 17/3071 |
| 2008/0052291 A1 * | 2/2008 | Bender | G06F 21/6227 |
| 2008/0222512 A1 | 9/2008 | Albornoz et al. | |
| 2009/0217158 A1 | 8/2009 | Bailey | |
| 2009/0260060 A1 | 10/2009 | Smith et al. | |
| 2009/0265747 A1 | 10/2009 | Li | |
| 2010/0010998 A1 | 1/2010 | Wagner | |
| 2010/0030578 A1 | 2/2010 | Siddique et al. | |
| 2010/0095203 A1 | 4/2010 | Toebes et al. | |
| 2010/0174983 A1 | 7/2010 | Levy et al. | |
| 2010/0211781 A1 | 8/2010 | Auradkar et al. | |
| 2010/0241668 A1 | 9/2010 | Susanto et al. | |
| 2010/0318893 A1 | 12/2010 | Matthews et al. | |
| 2010/0325686 A1 | 12/2010 | Davis et al. | |
| 2011/0055180 A1 | 3/2011 | Lumley et al. | |
| 2011/0078615 A1 | 3/2011 | Bier | |
| 2011/0088091 A1 | 4/2011 | Petronijevic et al. | |
| 2011/0099152 A1 | 4/2011 | Law et al. | |
| 2011/0145593 A1 | 6/2011 | Auradkar et al. | |
| 2011/0153680 A1 | 6/2011 | Rolla et al. | |
| 2011/0178981 A1 | 7/2011 | Bowen et al. | |
| 2011/0197266 A1 | 8/2011 | Chu et al. | |
| 2011/0231222 A1 * | 9/2011 | Sharma | G06Q 10/00 |
| | | | 705/7.29 |
| 2011/0289105 A1 | 11/2011 | Hershowitz | |
| 2011/0296517 A1 * | 12/2011 | Grigoriev | H04L 63/102 |
| | | | 726/12 |
| 2011/0302210 A1 | 12/2011 | Comanescu | |
| 2011/0320925 A1 | 12/2011 | Piersol et al. | |
| 2012/0030553 A1 | 2/2012 | Delpha et al. | |
| 2012/0136936 A1 | 5/2012 | Quintuna | |
| 2012/0192086 A1 | 7/2012 | Ghods et al. | |
| 2012/0222132 A1 | 8/2012 | Burger et al. | |
| 2012/0284605 A1 | 11/2012 | Sitrick et al. | |
| 2012/0323968 A1 | 12/2012 | Yih et al. | |
| 2013/0013560 A1 | 1/2013 | Goldberg et al. | |
| 2013/0061125 A1 | 3/2013 | O'Mara et al. | |
| 2013/0104028 A1 | 4/2013 | Murray et al. | |
| 2013/0151970 A1 | 6/2013 | Anchour | |
| 2013/0191451 A1 | 7/2013 | Tse et al. | |
| 2013/0219176 A1 | 8/2013 | Akella et al. | |
| 2013/0246901 A1 | 9/2013 | Massand | |
| 2013/0311420 A1 | 11/2013 | Tehranchi et al. | |
| 2014/0026025 A1 | 1/2014 | Smith | |
| 2014/0089775 A1 | 3/2014 | Worsley et al. | |
| 2014/0101310 A1 | 4/2014 | Savage et al. | |
| 2014/0115436 A1 | 4/2014 | Beaver et al. | |
| 2014/0115450 A1 * | 4/2014 | Zhong | G06Q 10/06 |
| | | | 715/255 |
| 2014/0196115 A1 | 7/2014 | Pelykh | |
| 2014/0229556 A1 | 8/2014 | Cooper et al. | |
| 2014/0250073 A1 | 9/2014 | Zalpuri et al. | |
| 2014/0281875 A1 | 9/2014 | Branton et al. | |
| 2014/0282921 A1 | 9/2014 | Filman et al. | |
| 2014/0351907 A1 | 11/2014 | Noble | |
| 2015/0067150 A1 * | 3/2015 | Heredia | G06F 17/30342 |
| | | | 709/224 |
| 2015/0106378 A1 * | 4/2015 | Clark | G06F 17/30707 |
| | | | 707/740 |
| 2015/0134600 A1 | 5/2015 | Eisner et al. | |
| 2015/0169500 A1 | 6/2015 | Balinsky et al. | |
| 2015/0199379 A1 | 7/2015 | Thierer et al. | |
| 2016/0156631 A1 | 6/2016 | Viswanathan et al. | |

FOREIGN PATENT DOCUMENTS

| | | |
|---|---|---|
| JP | 2005228253 A | 8/2005 |
| JP | 2007501969 A | 2/2007 |
| JP | 2009086742 A | 4/2009 |
| JP | 2010034920 A | 2/2010 |
| JP | 2011191862 | 9/2011 |
| JP | 2012209809 A | 10/2012 |
| KR | 20100080802 A | 7/2010 |
| KR | 20110000655 A | 1/2011 |
| KR | 101159504 B1 | 6/2012 |
| KR | 20140092831 A | 7/2014 |
| WO | 2009105735 A2 | 8/2009 |

OTHER PUBLICATIONS

Eppstein et al., "What's the Difference? Efficient Set Reconciliation Without Prior Context?", SIGCOMM '11, Toronto Ontario, Canada, Aug. 15-19, 2011, 12 pages.

(56) References Cited

OTHER PUBLICATIONS

International Search Report and Written Opinion dated Mar. 31, 2015, in International Patent Application No. PCT/US2014/64875, filed Nov. 10, 2014.
"Extended European Search Report, dated Oct. 27, 2017," European Patent Application No. 14859862.6, filed Nov. 10, 2014, 12 pages.
"Notice of acceptance for patent application dated Nov. 17, 2017," Australian Patent Application No. 2014346473, filed Nov. 10, 2014, 3 pages.
Kong et al., "Graphical Overlays: Using Layered Elements to Aid Chart Reading," IEEE Transactions on Visualization and Computer Graphics 18(21): 2631-2638, published online Oct. 9, 2012, printed publication Dec. 1, 2012.
"Decision of Patent Grant dated Oct. 2, 2017," Korean Patent Application No. 10-2016-7015415, filed Nov. 10, 2014, four pages.
Chinese First Office Action dated Dec. 3, 2018, Patent Application No. 201480072858.7, filed Nov. 10, 2014, 8 pages.
Doi et al., "A proposal of an Annotation System CollabSticky Focused on Collecting Comments in Presentation," Information Processing Society of Japan 2007(1):159-164, Jul. 2007.
He et al, "RIDEE-SPS: Presentation System for Realtime Interactive Distance Education Environment," Information Processing Society of Japan 44(3):700-708, Mar. 15, 2003.
Japanese First Office Action dated Oct. 15, 2018, Patent Application No. 2018-138930, filed Nov. 10, 2014, 4 pages.
Singaporean Notice of Eligibility for Grant and Supplementary Examination Report dated Dec. 24, 2018, Patent Application No. 11201603644X, filed Nov. 10, 2014, 3 pages.
Canadian Office Action dated Jun. 28, 2018, Patent Application No. 2930415, filed Nov. 10, 2014, 4 pages.
Japanese Final Rejection dated Mar. 26, 2018, Patent Application No. 2016-528236, filed Nov. 10, 2014, 4 pages.
Fujita et al., "Comprehensive Manual for Editing and Publishing Books for Amazon Kindle (p. 162)," MD Corporation, Inc., Jul. 21, 2013, 4 pages.
Japanese Final Rejection dated Mar. 4, 2019, Patent Application No. 2018-138930, filed Nov. 10, 2014, 3 pages.
Japanese Office Action dated Mar. 25, 2019, Patent Application No. 2016-528236, filed Nov. 10, 2014, 17 pages.
Canadian Office Action dated Jun. 4, 2019, Patent Application No. 2930415, filed Nov. 10, 2014, 3 pages.
Chinese Second Office Action dated Jun. 18, 2019, Patent Application No. 201480072858.7, filed Nov. 10, 2014, 3 pages.
European Communication under Rule 71(3) EPC dated Jun. 7, 2019, Patent Application No. 14859862.6, filed Nov. 10, 2014, 48 pages.
Wikipedia, "Portable Document Format," May 4, 2011 (retrieved Jun. 13, 2019), https://web.archive.org/web/20110504202116/http://en.wikipedia.org/wiki/PDF#Annotating_PDFs, 21 pages.
Chinese Notice of Grant dated Oct. 9, 2019, Patent Application No. 201480072858.7, filed Nov. 10, 2014, 4 pages.

\* cited by examiner

626

Scalable Database Service

| Collection ID | Collection Name | Document IDs | Confirmed |
|---|---|---|---|
| C001 | Work | D001, D002, D003 | Y |
| C002 | — | D003, D004 | N |

FIG. 6

FORMING A DOCUMENT COLLECTION IN A DOCUMENT MANAGEMENT AND COLLABORATION SYSTEM

CROSS-REFERENCE TO RELATED APPLICATIONS

This application incorporates by reference for all purposes the full disclosure of: co-pending U.S. patent application Ser. No. 14/077,204, filed on Nov. 11, 2013, entitled "DOCUMENT MANAGEMENT AND COLLABORATION SYSTEM" and co-pending U.S. patent application Ser. No. 14/175,884, filed concurrently herewith, entitled "ACCESS CONTROL FOR A DOCUMENT MANAGEMENT AND COLLABORATION SYSTEM."

BACKGROUND

The use of remote computing services, such as remote document storage, has greatly increased in recent years. An organization, for example, may support its operations using both internal networks of computing resources and computing resources managed by others. Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially given the multitude of different computing systems. For example, computers of the organization may include Personal Computers, Tablets, Smartphones, Laptops and other devices.

It is often challenging to provide mechanisms that enable grouping documents in a document collection. In addition, it is often challenging to analyze document or user attributes in order to recommend the user as a reviewer of the document.

BRIEF DESCRIPTION OF THE DRAWINGS

Various embodiments in accordance with the present disclosure will be described with reference to the drawings, in which:

FIG. 6 shows an example of a database table for usage in tracking a document collection in accordance with at least one embodiment;

DETAILED DESCRIPTION

Figure 1:
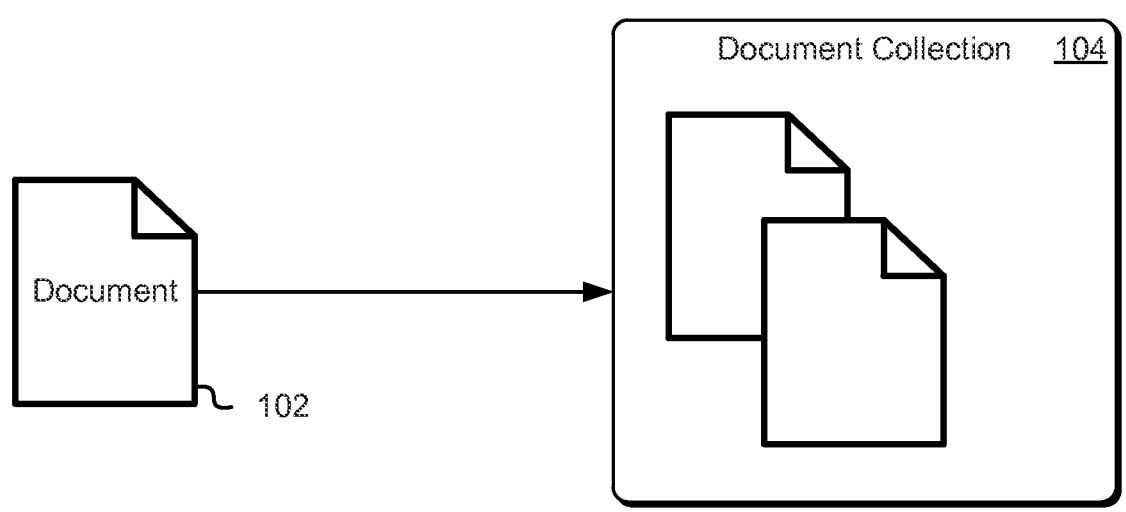
FIG. 1 shows an example of linking documents in a document collection in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include for utilizing document or user attributes for forming document collections in a document management and collaboration system. The documents retained by the document management and collaboration system may comprise any type of media, such as audio-visual media, that is capable of being rendered on a computing device of a user. Further, the document may be any structured collection of information. A document may be a computer file that is capable of being produced by or edited or viewed using a productivity program or suite. Accordingly, the document may comprise editable or non-editable text, images, drawings and web pages, among others. In addition to enabling users to collaborate and share documents, the document management and collaboration system may provide the users with file systems or organizational structures to manage the documents. The organizational structures may include directories having nested folders and subfolders of documents and may be accessible to the users and utilized by the user as a way to access documents.

In addition to being part of an organizational structure, documents retained by the document management and collaboration system may also be grouped in a document collection. The documents may be grouped to facilitate user access to the documents, whereby the documents may be grouped because the documents have features or common. To facilitate forming a document collection, a document management and collaboration system may identify one or more documents as being candidates for forming a document collection. The identification may be based at least in part on attributes of the documents or attributes of users of the document management and collaboration system that have one or more particular relationships with the one or more documents, such as being a collaborator on the one or more documents. Further, the identification may be based at least in part on a relationship between the documents or their associated attributes or a measure of relatedness or similarity between the documents.

Document attributes may be based at least in part on content of the document, time of document upload, an identity of a party uploading the document, an identity of users accessing the document or identities of document collections that presently include the document, among others. User attributes may include the identity or content of documents or document collections uploaded, accessed or searched for by the user or a relationship or link between the user and others users within an organization, among others. The identified documents may be provided to a user (for example, as being recommended or suggested to be included in a document collection) and the user may request that a collection be formed using the identified documents or using one or more other documents. Further, the user may share the document collection with other users (for example, members of the user's organization).

A policy may define the manner in which documents are identified for grouping. The policy may be trained or adapted based at least in part on user selection of documents for incorporation in the document collection. For example, the policy may specify one or more weights that indicate the contribution of one or more document criteria for identifying documents to be included in a collection. The weights may be adjusted based at least in part on user behavior.

In addition to suggesting documents for incorporation in a document collection, the document management and collaboration system may also suggest a reviewer for a document or a set of documents, such as a document collection, folder or directory. The reviewer may be a member of an organization to which the document belongs. For example, the suggested reviewer may be identified as an authority or an expert on a particular topic. As described herein, the reviewer may be identified based at least in part on attributes of the reviewer and/or attributes of the document. The attributes of the reviewer my include one or more tags applied by the reviewer to documents in the document management and collaboration system or the content of documents viewed, searched for or uploaded by the reviewer, among others. Further, the one or more attributes of the user may be received from a service, such as a corporate directory service or the like. A determination as to whether to recommend a user as a reviewer for a document may be based at least in part on a recommendations algorithm, such as collaborative filtering or content-based filtering algorithms. Such a determination may additionally or alternatively be based at least in part on a scheduling algorithm for reviewers, which may, for example, be a round-robin scheduling algorithm. Further, user attributes may include a number of documents presently awaiting review by the reviewer, the rate at which the reviewer completes the review of a document or the average length of time a reviewer takes before accessing or reviewing the document, among others. After the reviewers for a document are identified, the identities of the may be provided to a user who may, in turn, select between some or all the suggested reviewers. Following the selection, the document may be provided to the reviewer.

FIG. 1 shows an example of linking documents in a document collection in accordance with at least one embodiment. A document 102, which may be any type of media, such as written text and/or audio-visual media, and may be capable of being rendered on a computing device of a user. Further, the document may be any type of file structure and may be maintained in a directory of a document management and collaboration system. A document collection 104 including one or more documents may by sought to be formed. The document 102 may be analyzed to determine whether it is a candidate for inclusion in the document collection 104. For example, one or more document properties or attributes may be evaluated and compared with properties or attributes of other documents, which may be already part of the collection or also candidates for inclusion in the collection. Alternatively, the document could be inserted into a collection automatically. Based at least in part on the comparison, a determination is made as to whether the document 104 may be recommended or suggested for inclusion in the document collection 104. A user who has uploaded or viewed the document 102 may receive the recommendation and provide an instruction as to whether the document 102 is to be included in the collection. Being part of the document collection 104, the document 102 along with other documents in the document collection 104 may be collectively shared between users.

Figure 2:
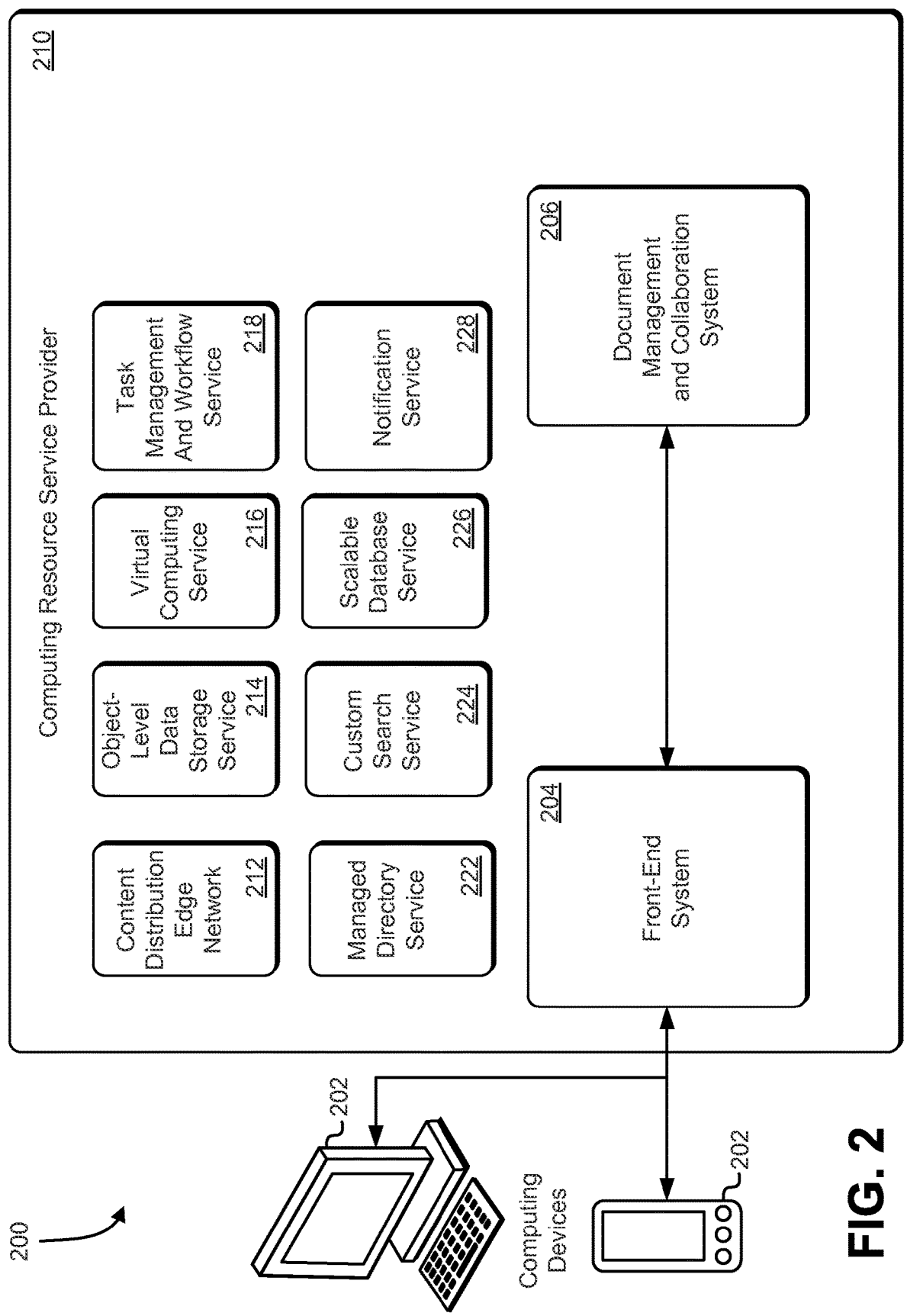
FIG. 2 shows an example of computing devices connected to a computing resource service provider in accordance with at least one embodiment.

FIG. 2 shows an example of computing devices connected to a computing resource service provider in accordance with at least one embodiment. The computing devices 202 may be any device that is capable of communicating with the computing resource service provider 210 or its entities. The computing devices 202 may also be equipped with local or remote (for example, network-based) computational and storage capabilities. The computational capabilities may be provided or enabled by a processor, such as a central processing unit (CPU), graphics processing unit (GPU), digital signal processor and the like. Examples of CPUs include CPUs that employ an x86 architecture (for example, as used in desktop and laptop computing devices) or a reduced instruction set computing (RISC) architecture (for example, as used in smartphone and tablet computing devices). The computing devices 202 may also be equipped with communications and networking hardware and may be capable of communicating using any communications protocol. Further, the computing devices 202 may be equipped with input/output devices that may include a display, a touch screen-based or keyboard-based input device or speakers. Additionally, the computing devices may include any type of memory, such as static or dynamic memory, and a power source or a power adapter. Aside from their hardware capability, the computing devices 202 may be configured to run or execute an operating system and/or other programs and the computing devices' 202 associated memory may store executable instructions that, when executed by one or more processor, cause one or more functions to be performed or cause the operating system and/or other programs to run. Although two devices are shown in FIG. 2, any number of devices may be contemplated in various embodiments. Further, the computing devices 202 may communicate with the computing resource service provider 210 or any entity of the computing resource service provider 210 via a network (not shown). The network may be public or private, whereby examples of the network include the Internet and an Internet service provider (ISP) network.

The computing devices 202 may collectively or individually be associated with a user or a customer of the computing resource service provider 210 or its entities and functions. The user may be part of an organization that may utilize one or more of the services provided by the computing resource service provider 210 to maintain and deliver information to its employees, which may be located in various geographical locations. Additionally, the user may be an individual that utilizes the services of the computing resource service provider 210 to deliver content to a working group located remotely. Further, one or more of the computing device 202 may belong to an administrator of an organization or a group. The administrator may utilize the computing device 202 to communicate with the computing resource service provider 210 to specify access control policies. Utilizing a computing device, a user or reviewer may access documents in a document management and collaboration system and may receive indications of one or more recommendations made by the document management and collaboration system.

The computing resource service provider 210 includes a front-end system 204 and a file management and collaboration system 206 as well as plurality of services and systems as shown in FIG. 2. These include a content distribution edge network 212, an object-level data storage service 214, a virtual computing service 216, a task management and workflow service 218, a managed directory service 222, a custom search service 224, a scalable database service 226 and a notification service 228. It is noted that in various embodiments, the computing resource service provider 210 may include fewer services and systems than those described with references to FIG. 2 or may include additional or alternative services or systems to those described with reference to FIG. 2. Further, in alternative embodiments, the systems and services may be utilized outside the context of the computing resources service provider 210. For example, the services and systems may be stand-alone or used in conjunction with systems and services other than those described with reference to FIG. 2.

The front-end system 204 may be a gateway to the file management and collaboration system 206 and may offer private and public services to users, administrators or their computing devices 202. Access to the front end system 204 may require authorization or user authentication. In addition, a device or user privilege level may govern access to the front-end system 204 and any data exchanges between the front-end system 204 and the computing devices 202. Access to the front-end system 204 may be governed by a privilege level associated with a computing device 202 or a privilege level or credential given to the computing device 202 or a user of the computing device 202, for example, by a group or organization administrator.

The front-end system 204 may perform authentication of a customer, a user or a device before granting access to the resources of the file management and collaboration system 206. The authentication may be based on credentials, such as username and password information, or access tokens, among others. The front-end system 204 may provide services and interfaces that permit or enable user access. For example, the front-end system 204 may enable a web-based platform or a console-based platform that provides information related to the services of the computing resource service provider 210 to the user. Further, the front-end system 204 may enable the user to execute applications or tasks in the computing resource service provider 210, track and manage the execution of the applications or tasks and receive the results of the execution and transmit the results to user devices. As further described herein, the front-end system 204 may be the gateway by which the user or associated devices 202 may utilize the plurality of services provided by the computing resource service provider 210.

The document management and collaboration system 206 may be a collection of computing devices and other resources collectively configured to enable and manage the execution and processing of documents for collaboration between one or more users in a distributed system. The document management and collaboration system 206 may, for example, enable uploading documents to the computing resource service provider 210 and retaining and modifying metadata associated with the documents. The document management and collaboration system 206 may further allow for search functions associated with the documents or their metadata as well as collaborations between users on the documents.

Although the term "document" is used herein to describe objects produced or collaborated on by users of the computing resource service provider 206, the term "document" is not limited to media, such as audio-visual media. A document may be a computer file that is capable of being produced by or edited or viewed using a productivity program or suite. Accordingly, the document may be editable or non-editable text, images, drawings and websites, among others.

The content distribution edge network 212 of the computing resource service provider 210 may be a collection of computing devices and other resources collectively configured to deliver content, such as web content, to a plurality of users. The content distribution edge network 212 may have a plurality of edge locations, for example, that are distributed in world-wide locations that are strategically placed to optimize user data throughput and minimize latency. The content distribution edge network 212 may receive requests for content and deliver the requested content to users. The content distribution edge network 212 may interface with a storage service that stores a portion or all of the content and may cause the content to be retrieved and provided to a requesting party. The content distribution edge network 212 may be utilized to enable user-accessible websites or web applications of the front-end system 204.

The object-level data storage service 214 may be a collection of computing resources configured to synchronously process requests to store and/or access data. The object-level data storage service 214 may operate using computing resources (e.g., databases) that enable the object-level data storage service 214 to locate and retrieve data quickly, so as to allow data to be provided in responses to requests for the data. For example, the object-level data storage service 214 may maintain stored data in a manner such that, when a request for a data object is retrieved, the data object can be provided (or streaming of the data object can be initiated) in a response to the request. As noted, data stored in the object-level data storage service 214 may be organized into data objects. The data objects may have arbitrary sizes except, perhaps, for certain constraints on size. Thus, the object-level data storage service 214 may store numerous data objects of varying sizes. As described herein, the object-level data storage service 214 may store any type of document, such as a document source file, a common representation underlay, a preview, a thumbnail or extracted document text, among others.

The virtual computing service 216 may be a collection of computing resources configured to instantiate virtual machine instances on behalf of an entity of the computing resource service provider 210 (such as the document management and collaboration system 206) or on behalf of a customer. A party may interact with the virtual computing service 216 (via appropriately configured and authenticated API calls) to provision and operate virtual computer systems that are instantiated on physical computing devices hosted and operated by the virtual computing service 216. The virtual computer systems may be used for various purposes, such as to operate as servers supporting a website, to operate business applications or, generally, to serve as computing power. Further, the virtual computer systems may be used to support database applications, electronic commerce applications, business applications and/or other applications. Although the virtual computing service 216 is shown in FIG. 2, any other computer system or computer system service may be utilized, such as a computer system or computer system service that does not employ virtualization or instantiation and instead provisions computing resources on dedicated or shared computers/servers and/or other physical devices.

The task management and workflow service 218 may be a collection of computing devices and other resources collectively configured to perform task coordination and management services that enable executing computing tasks across a plurality of computing environments and platforms. The task management and workflow service 218 tracks the progress of workflow execution and performs the dispatching and holding of tasks. Further, the task management and workflow service 218 may control the assignment of hosts or physical or virtual computing machines used for executing the tasks. A user may define a workflow for execution, whereby the workflow may include one or more tasks. The workflow may be defined using an application programming interface (API) configured function call to the task management and workflow service 218. Further, the user may specify task order for the workflow, conditional flows and timeout periods for restarting or terminating the execution of the workflow. In addition, execution loops for the workflow may be defined. As described herein, workflow execution may by asynchronous and may be preceded by synchronous execution of database writes.

The managed directory service 222 may be a collection of computing devices and other resources collectively configured to serve as a directory that enables users to log on to computing resources of the computing resource service provider 210 using one set of credentials and to enable administrators to uniformly apply security policies to the computing resource service provider 210. The managed directory service 222 may enable a web-based console for user and group management and may be used as an authentication system for user credentials.

The custom search service 224 may be a collection of computing devices and other resources collectively configured to permit customized searches of data sets and enable establishing security or authentication requirements on a party performing a search. Further, the custom search service 224 allows for data set replication to enable consistent performance in the case of outages. As described herein, the customer search service 224 may be utilized for maintaining a search index of customer documents and their associated metadata. Further, to ensure consistent performance the searchable metadata or customer documents may be replicated to ensure consistent performance and guard against outages.

The scalable database service 226 may be a collection of computing devices and other resources collectively configured to provide a structured storage system that facilitates the storage and retrieval of documents or data. The scalable database service 226 may be non-relational and may be based on a key-value model. Examples of the scalable database service 226 include a NoSQL database (for example, to be distinguished from a relational structured query language (SQL) database). The scalable database service 226 may be used to store metadata associated with documents, users and organizations. In addition, scalable database service 226 may store access privileges for users of an organization.

In the environment illustrated in FIG. 2, a notification service 228 is included. The notification service 228 may comprise a collection of computing resources collectively configured to provide a web service or other interface and browser-based management console. The management console can be used to configure topics for which customers seek to notify applications (or people), subscribe clients to the topics, publish messages, or configure delivery of the messages over clients' protocol of choice (i.e., hypertext transfer protocol (HTTP), e-mail and short message service (SMS), among others). The notification service 228 may provide notifications to clients using a "push" mechanism without the need to periodically check or "poll" for new information and updates.

Figure 3:
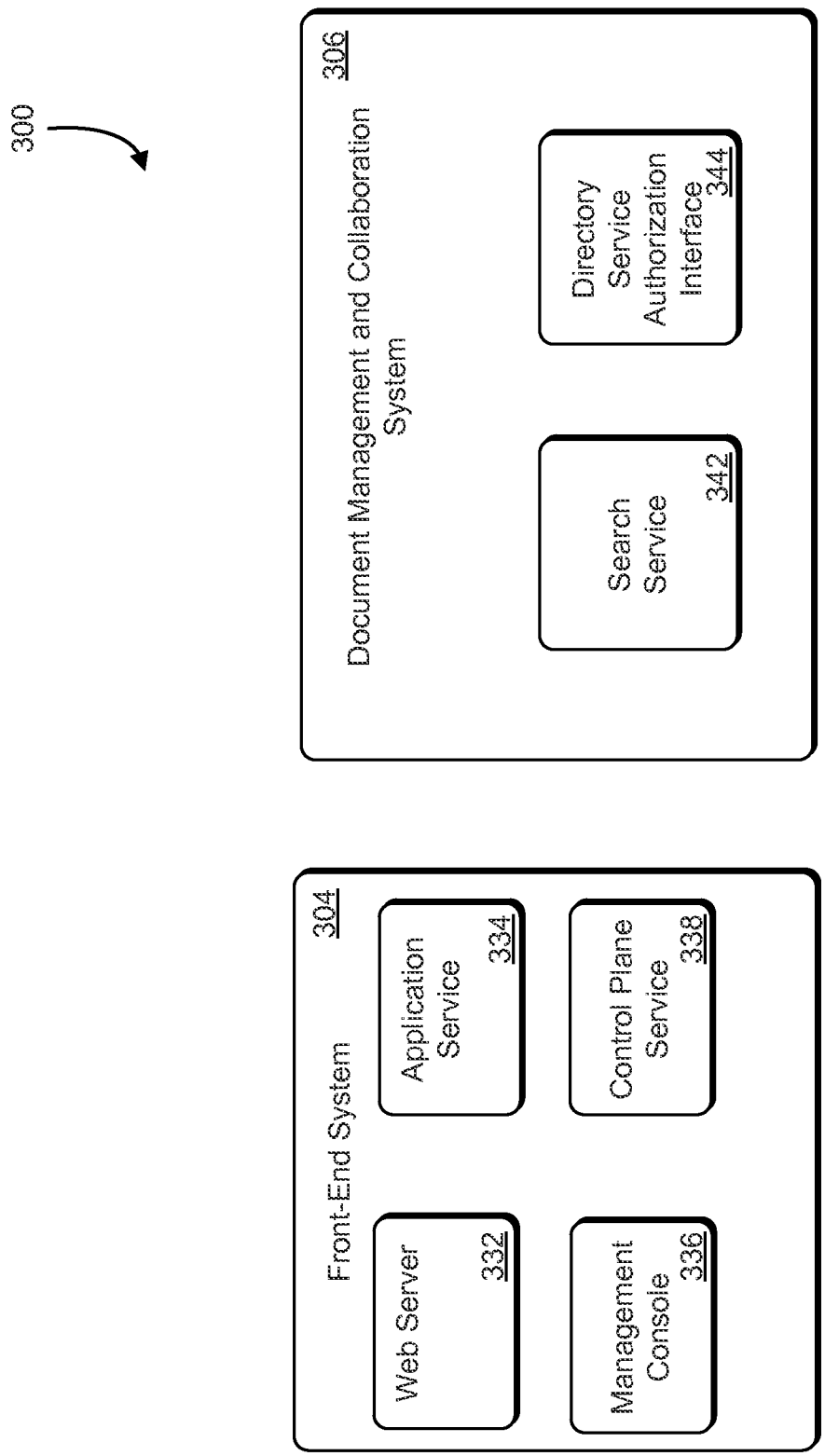
FIG. 3 shows the functional entities of the front-end system and the document management and collaboration system in accordance with at least one embodiment.

FIG. 3 shows the functional entities of the front-end system and the document management and collaboration system in accordance with at least one embodiment. The front-end system 304 includes a web server 332, an application service 334, a management console 336 and a control plane service 338. The web server 332 may enable the execution of a web site, a single-page web application or a single-page interface that permits a user to transmit or upload documents to the document management and collaboration system 306 and manage the documents. The web server may further enable the user to view and edit documents, and provide commentary or feedback on the documents. The web server 332 may also enable an administrator or a user to set permissions or share modes that specify the privileges given to a user in accessing documents, for example, using an access control policy. In addition, the web server may enable users or devices to submit authentication credentials. The content distribution edge network, described with reference to numeral 212 in FIG. 2, may be used to distribute content of the web server 332. The actions performed by the user may be done via a website, an application or a management console and the web server 332 may enable executing the website, application or management console. Although one web server 332 is described with reference to FIG. 3, it may be contemplated that multiple web servers of any type may be used, whereby a portion of the web servers may be redundant.

The application service 334 may be a collection of computing devices and other resources collectively configured to serve as a user-exposed service that receives requests from the user and services the requests. A user request may be made using a website or a management console accessible to the user or a client that is executed on a user's device may make service requests on behalf of the user. The request may be an API function call and the application service 334 may process the request and manage its execution. The application service 334 may also be responsible for receiving user credentials and request authentication of the user from an authentication service. To cause the performance of operations requested by the user, the application service 334 may make one or more function calls to services or entities of the computing resource service provider 210. For example, the application service 334 may request user or access token validation from the managed directory service 222 or may cause search indices maintained by the customer search service 224 to be updated.

The management console 336 may be a collection of computing devices and other resources collectively configured to permit organizations, administrators and users to register for utilizing document management and collaboration services. The management console 336 may be used in addition or as an alternative to a website or an application running on a user device and may permit users and administrators to make service requests using appropriately configured API function calls. For example, the management console 336 may be used for inviting a user to join a document collaboration system and view and collaborate on documents. Further, the management console 336 may be used for allowing dashboard access, audit log access, permission setting (for example, for administrators and user), storage limit setting (for example, for organizations and users) and security setting (for example, password and encryption).

The control plane service 338 of the front-end system 304 may be a collection of computing devices and other resources collectively configured to serve as an interface that enables creating new computing instances for document collaboration and management. Instances may be created by transparently creating a directory in the managed directory service 222 or associating an existing directory (for example, maintained by the managed directory service 222 or by a user or administrators) for document management and collaboration. The control plane service 338 may be utilized to create a document directory and the document directory may be executed and served by the managed directory service 222. The document directory may be associated with an organization having an administrator that is capable of providing permissions and privileges to users. Following the creation of the directory, the application service 334 may be used to enable functions affecting folders or documents of the directory.

The document management and collaboration system 306 includes a search service 342 and a directory service authorization interface 344. The search service 342 may be a collection of computing devices and other resources collectively configured to cause an uploaded document to become searchable. For example, the search service 342 may facilitate text extraction for a document, whereby the extracted text may be used to construct a character map for the document as described herein. The directory service authorization interface 344 enables the document management and collaboration system 306 to delegate user authentication to another entity such the managed directory service described with reference to numeral 222 in FIG. 2. In various embodiments, the document management and collaboration system 306 may include one or more entities configured to identify one or more documents for inclusion in a document collection. The one or more entities may be a collection of computing devices and other resources collectively configured to analyze one or more user or document attributes and provide recommendations of documents to be included in a collection. Further, the one or more entities may also provide recommendations of users who may review documents retained by the document management and collaboration system 306.

Figure 4:
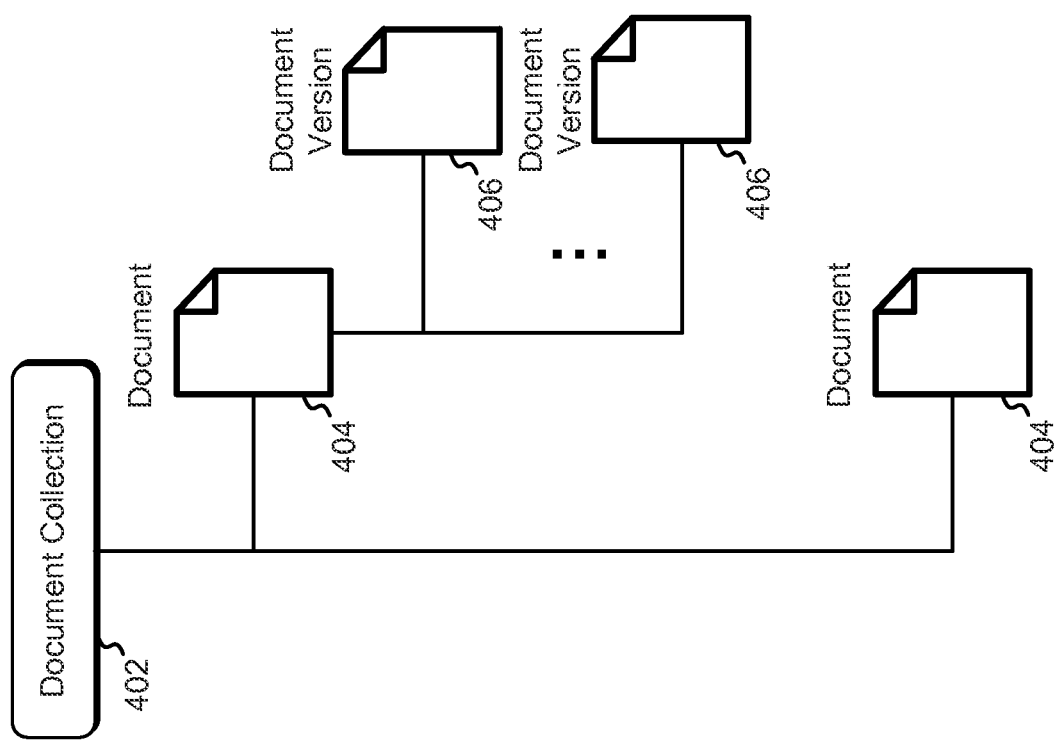
FIG. 4 shows an example of a document collection in accordance with at least one embodiment.

FIG. 4 shows an example of a document collection in accordance with at least one embodiment. The document collection 402 comprises a plurality of documents 404 (singularly referred to herein as document 404). The documents 404 may be linked together or associated with one another as being part of a document management and collaboration system. The linking of the documents 404 in the document collection 402 facilitates collaboration on documents and the sharing of documents between users. Further, the document collection 402 facilitates grouping related documents together and identifying the documents 404 as a group (for example, in addition to each document's 404 individual identity). Each document 404 of the document collection 402 may be stored by the document management and collaboration system and may be individually accessed by one or more users. Linking the documents 404 in a document collection 402 may aid users in accessing similar documents (for example, documents that have similar content or that were received by the document management and collaboration system from one user). A user may view documents that are part of the document collection 402. Further, when viewing a document that is part of a collection 402, the user may be able to view the identities of other documents that are part of the collection 402. Further, the user may access the other documents (if the permitted by the access privileges of the user).

A document 404 may have a plurality of document versions 406. A document version 406 may be one revision of the document 406 or a subsequent version or revision of an existing document including, for example, user modifications and changes. Each document version 406 may have a plurality of representations including a native document, an underlay and an overlay. The native document may be an originally uploaded document (for example, in a file format compatible with a standard productivity suite). An underlay may be a portable representation of the native document that may be rendered on a user device utilizing a web application or a document management and collaboration application. In addition, an overlay may be a representation of annotations made by users and collaborators. For example, an overlay may include a representation of highlights or text commentary. It is noted that more than one document versions 406 may include the originally uploaded native document.

Figure 5:
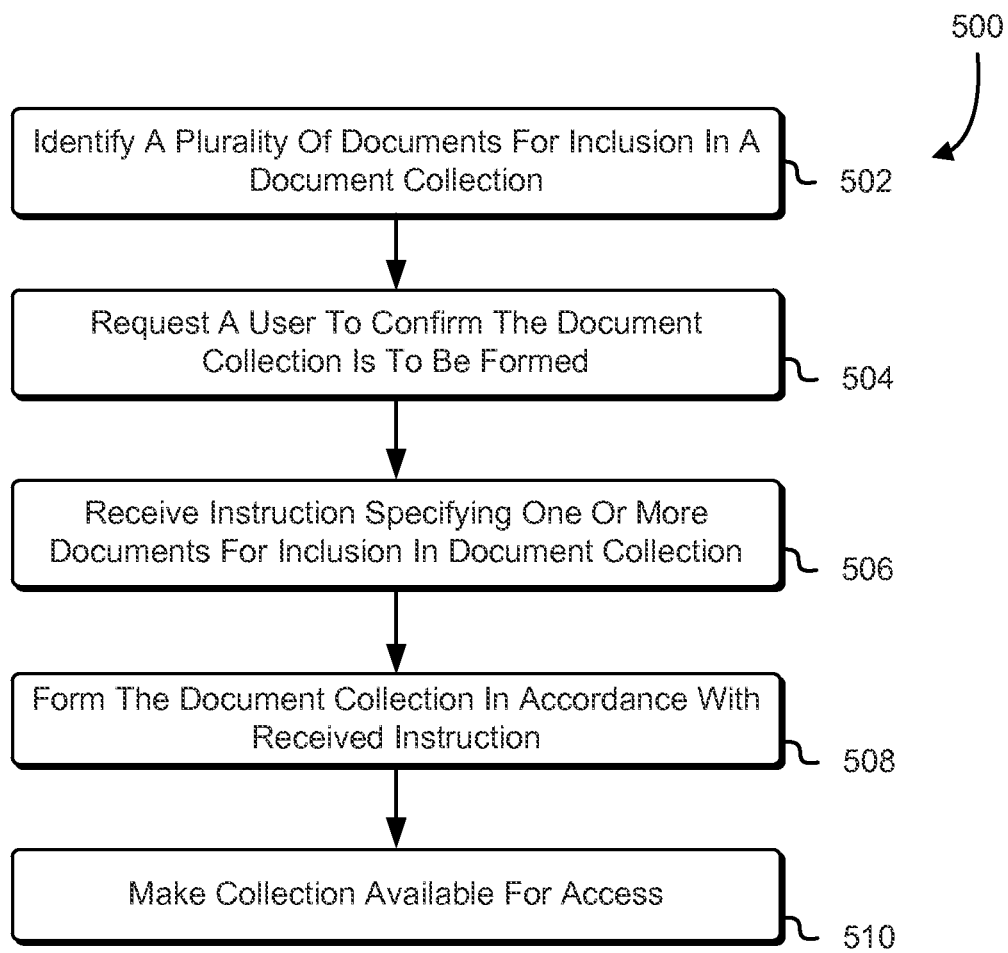
FIG. 5 shows an example of a method for forming a document collection in accordance with at least one embodiment.

FIG. 5 shows an example of a method for forming a document collection in accordance with at least one embodiment. In the process 500, a document management and collaboration system, such as the document management and collaboration system described with reference to numeral 206 in FIG. 2, identifies 502 a plurality of documents for inclusion in a document collection. The plurality of documents may be identified based at least in part on one or more attributes associated with the documents as described herein. Further, the documents may be identified based at least in part on a measure of relationship or relatedness between the documents. The plurality of documents may be identified based at least in part on an upload time of the documents, the contents of the documents or the identities of one or more users accessing the documents, among others. With respect to the content of the documents, a correlation between the characters of a first document (for example, words, phrases, strings or numbers present in the first document) and the characters of a second document may be obtained, and if the correlation measure exceeds a threshold, the two documents may be considered for inclusion in the document collection. The one or more attributes may be evaluated together or separately in determining whether the plurality of documents are to be included in the document collection. Further, each attribute may be associated with a weight that represents the contribution of the attribute in a determination to include the document in the document collection. For example, the upload time of a document may be associated with a higher weight that the content of the document. Accordingly, two documents that were uploaded within a short time interval may be considered for inclusion in the document collection even if the two documents do not share similar content, for example, as determined by a correlation measure.

After identifying the plurality of documents, the document management and collaboration system requests 504 a user to confirm that the document collection is to be formed. However, in alternative embodiments the user does not need to confirm that the collection is formed. Rather, the document and collaboration system may automatically group documents in to collections. In an embodiment where the user is prompted to confirm that the document is to be formed, the user may communicate with the document management and collaboration system over a network, such as the Internet. As described herein, the user may be provided with an application for communicating with the document management and collaboration system. The application may be executed on a user device, such as a laptop, tablet or desktop computer, and may enable remotely accessing the various collections or directories of the document management and collaboration system and their associated documents. Further, the application may enable document viewing functionality as well as annotating and commenting functionality. An application may also be a web browser, whereby remote access to the document management and collaboration system may be enabled by a browser of the user device. Further, documents may be viewed and edited within the browser. The application may also enable the exchange of messages or notifications between the user device and the document management and collaboration system, whereby using the application messages or notifications may be made available to a user on a user device. As described herein, a user may use the application to remotely access the document management and collaboration system, and the document management and collaboration system in turn provides information to the user via the application.

The document management and collaboration system may provide the user with the identities of the plurality of documents and may request that the user confirm that the collection is sought to be formed. For example, the user may be viewing a document in a reading pane window of an application or a browser and the document management and collaboration system may determine that the document is candidate for inclusion in a document collection along with one or more other documents. A side panel may be used for indicating the one or more other documents and the user may select at least one document of the one or more other documents for inclusion in the document collection. Alternatively, the user may indicate that the document collection may only include the document being viewed. Further, the user may search for one or more other documents to be included in the document collection and may accept or reject including the suggested documents. The actions performed by the user in response to receiving the suggested documents may be used to train future suggestions. For example, a policy may be retained that specifies one or more factors to be considered when identifying documents for inclusion in a document collection, whereby the policy may be informed by user habits and may be modified based at least in part on the user habits. For example, if a user accepts a suggested plurality of documents for inclusion in a connection without change, the policy may be reinforced. Alternatively, if the user rejects the suggested documents in favor of other documents, the policy may be modified based at least in part on user behavior.

The document management and collaboration system then receives 506 an instruction from the user specifying one or more documents for inclusion in the document collection. The document management and collaboration system then forms 508 the collection in accordance with the received instruction. Further, the document management and collaboration system makes 510 the collection available for access. Access to the collection or one or more documents of the collection may be governed an access control policy, whereby a user's privileges may cause the user to be granted access to a document of the collection or the collection as a whole. As described herein, accessing a document may include adding or uploading a new version of the document, modifying the document or annotating the document, among others.

FIG. 6 shows an example of a database table for usage in tracking a document collection in accordance with at least one embodiment. The table 602 may be implemented in a scalable database service 626. The table 602 may include an index for a collection identity 604, whereby the collection identity may be the identity of the collection as assigned by the document management and collaboration system. Further, the table 602 may include an index for the collection name 606 assigned by a user for the document collection and index for the identities of document 608 that are part of the collection. In addition, the table 602 may include an index 610 that specifies whether the collection is confirmed by the user. If the collection is confirmed by the user, the collection may be formed and presented to the user or one or more other users. If the collection is not confirmed, the entry for the collection in the table 602 may be removed after the expiration of a specified time period.

A collection may be formed based at least in part on a search criteria provided by the user. For example, the user may request that a search be performed on the documents retained by the document management and collaboration system (or the documents belonging to the user's organization). The user may provide one or more criteria for the search, and a search result may be provided to the user identifying one or more documents that meet the one or more criteria. Further, a document collection may be formed for the documents that meet the one or more criteria.

Figure 7:
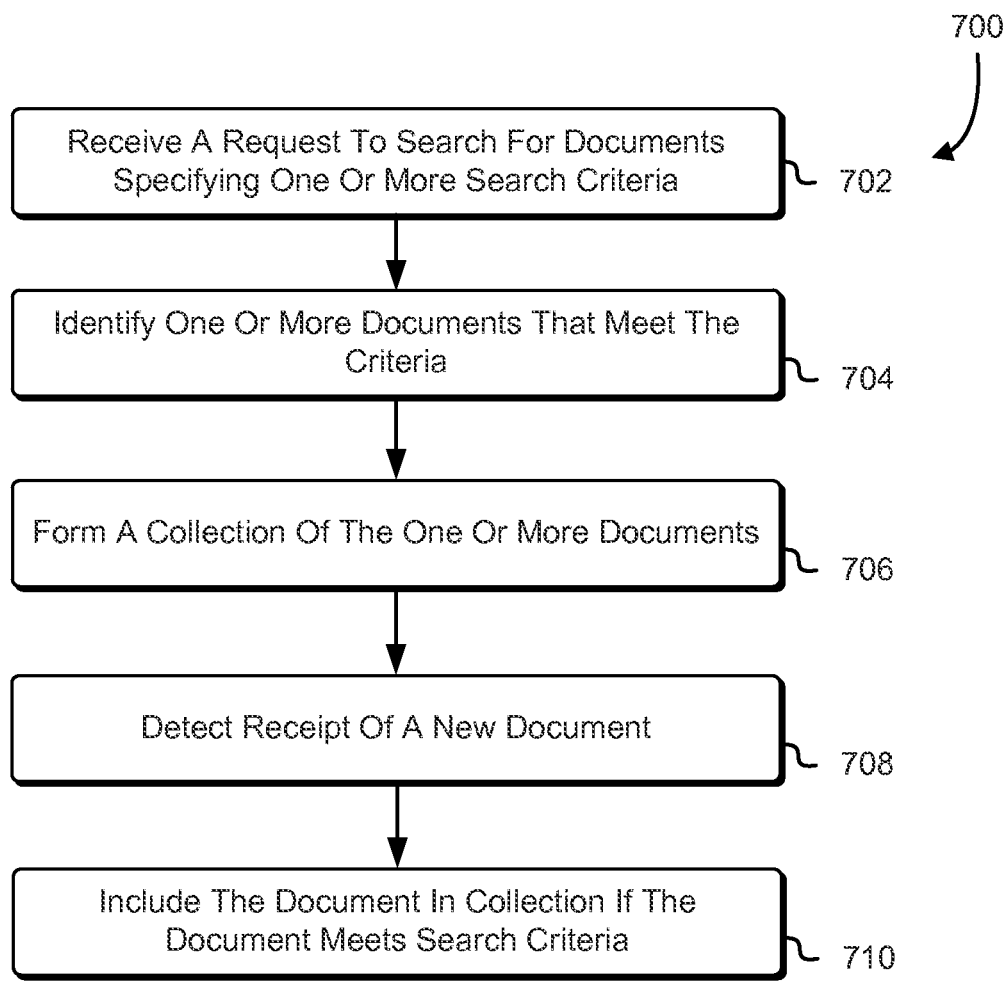
FIG. 7 shows an example of a method for forming a document collection in accordance with at least one embodiment.

FIG. 7 shows an example of a method for forming a document collection in accordance with at least one embodiment. In the process 700, the document management and collaboration system receives 702 a request to search for documents, whereby the request may specify one or more search criteria. The request to search the document may be facilitated by an application executed on the user device. The application may enable the user device to communicate with the document management and collaboration system over a network, whereby the application may also provide the user with a capability to submit queries to the document management and collaboration system. A query submitted utilizing the application may be transmitted to the document management and collaboration system that is executed remotely. The document management and collaboration system identifies 704 one or more documents that meet the criteria. Further, the document management and collaboration system form 706 a collection of the one or more documents. Prior to forming the collection, the document management and collaboration system may receive user confirmation that the document collection should be formed.

After the document collection is formed, the document collection may grow as documents are added. For example, the documents may be added to a directory or an organization of which the user is a member. The document management and collaboration system detects 708 receipt of a new document. Further, the document management and collaboration system includes 710 the document in the collection if the document meets the one or more search criteria provided by the user. In embodiments, the user may be given the choice to specify whether newly added documents may be included in the collection due at least in part to the fact that the newly added documents meet the one or more search criteria.

When forming a document collection, a check for an access privilege conflict may be made to determine whether the documents used in the collection may be linked together. Access privileges to documents may vary, whereby some users may have an access permission level that permits the users to perform certain actions that may be denied to other users. For example, if a user attempts to share the document collection with another user, a check for an access privilege conflict may be performed to determine whether the other user has an access privilege to the documents. If the other user is not permitted to access one or more documents in the collection, their attempt to access the document will fail. Accordingly, the user may be notified that the other user may not have access to the one or more documents. Further, an administrator of the organization to which the user belongs may be notified of the attempt to share the document, whereby the administrator may give the other user access to the one or more documents in order to facilitate the attempted sharing.

Failed user attempts to share a document collection may be recorded or logged and the document management and collaboration system may aggregate the failed attempts and provide them to an administrator. The administrator may modify their access control policy in accordance with received indications of failed attempts to share one or more documents.

Identifying documents for inclusion in a document collection may be based at least in part on a measure of relationship or dependence between the documents, such as a correlation. For example, the correlation may be based at least in part on temporal attribute associated with the documents including an upload time or an access time by a user. For example, documents that are uploaded or accessed within a short span of time may be better candidates for inclusion in a document collection than documents whose uploaded or accessed times are separated by a long duration of time.

Further, the documents may be identified based at least in part on a measure of relationship between the content of the documents. For example, a character map may be constructed for each document, whereby the character map assigns weights to characters and the location of the characters that are present in the content of the document. As described herein, a character may include a word, a phrase or a number, among others. The weight assigned to each character may be a function of the frequency of the occurrence of the character in the document and/or where the character is in the document (e.g., characters in a header/footer or title may be given greater weights). Further, the weight may be biased to account for an expected weight associated with the character in conventional usage. For example, a single mention of the phrase "document collection" may have a greater weight than a single mention of the word "the" because the phrase "document collection" may be expected to appear less frequently than the word "the". The character maps of documents may be compared (for example, using a correlation function) and the comparison may be used to determine if the documents should be linked in a document collection. Further, documents may be linked based at least in part on any attribute associated with the documents, such as common formatting or common titles. Reference is made herein to co-pending U.S. patent application Ser. No. 14/175,884, filed concurrently herewith, entitled "ACCESS CONTROL FOR A DOCUMENT MANAGEMENT AND COLLABORATION SYSTEM" describing document attributes. In addition, the documents may be linked based at least in part on user access to the documents. For example, if a set of users frequently access a set of documents, the set of documents may be linked in a document collection for the set of users.

The document management and collaboration system may provide a recommendation to a user of one or more suggested reviewers to review a document or a collection of documents. The one or more suggested reviewers may be users of the document management and collaboration system and may be part of the same organization as the user or part of a different organization. The suggested reviewers may be solicited for providing feedback on a document by, for example, commenting on the document or annotating the document. Once confirmed by the user, the one or more suggested reviewers may be given permission to view the document, comment on the document or annotate the document. The document management and collaboration system may identify the reviewer based at least in part on one or more attributes associated with the reviewers or the document. The user attributes may include a number of documents presently awaiting review by the reviewer, the rate at which the reviewer completes the review of a document or the average length of time a reviewer takes before accessing or reviewing the document, among others. Further, a reviewer may be assigned to a document in a round-robin fashion or according to any other type of scheduling algorithm, such as weighted round-robin.

The one or more attributes of the reviewers may be based at least in part on indications received from a service utilized by the reviewers that may include an email service, a calendar service or a location service, among others. Further, an indication may be received from a directory service, such as a Lightweight Directory Access Protocol (LDAP) directory. For example, an email service may provide an indication that the one or more reviewers received an email from a user referencing the document or that a phrase appearing the document was cited in an email between the user and the one or more reviewers. The indication may be used to recommend the one or more reviewers as parties who may view and comment on the document. Further, a calendar service may provide an indication that a user of the document has an event on their calendar with the one or more reviewers. The relationship between the user and the one or more reviewers as indicated by the calendar service may also be used to recommend the reviewers.

Similar to identifying related documents based at least in part on a measure of relationship between the content of the documents, a reviewer may be identified based at least in part on a relationship between the content of the document and the content of documents accessed by the reviewer. For example, a character map may be constructed for documents accessed by the reviewer including documents uploaded, viewed or annotated by the reviewer. A measure of relationship may be obtained between the character map of documents accessed by the reviewer and the document for which reviewers are sought. The reviewer may be recommended based at least in part on the obtained measure of relationship.

The suggested reviewers may be provided to a user and the user may select one or more reviewers for the document. Further, user behavior in selecting reviewers may be tracked and may be used to influence future reviewer recommendations. For example, if the user frequently selects a review, the selected reviewer may be favored when making future recommendations. Further, if the user frequently selects a certain reviewer for documents or document collections that have a particular character map, the likelihood of recommending the reviewer for future documents having a similar character map may be increased.

Figure 8:
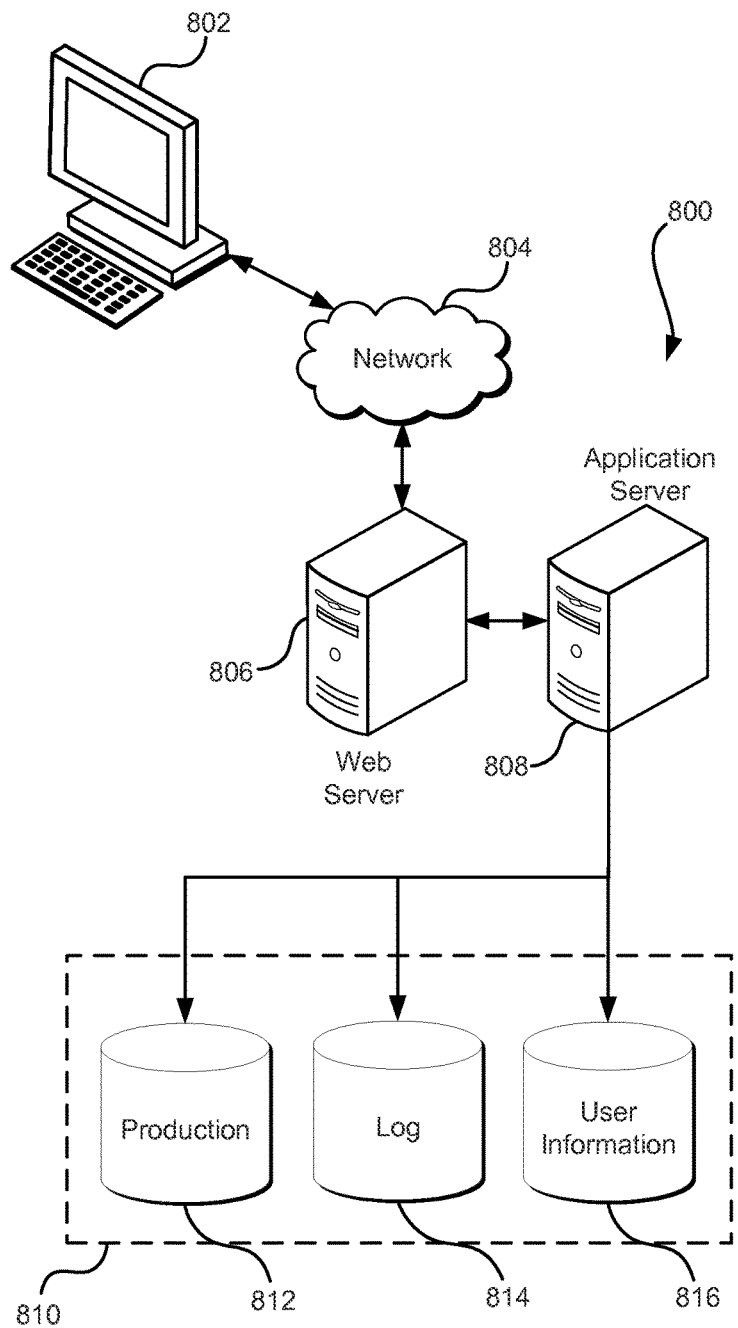
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management.

These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Different embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   identifying a plurality of documents, in a document management and collaboration system, as candidates for inclusion in a document collection, based at least in part on a first correlation between a first attribute of at least one document and related attributes of the plurality of documents, the first attribute including content determined based at least in part on a character map constructed for the at least one document;
   transmitting over a network a request to a first user to confirm the document collection, the request identifying the plurality of documents;
   in response to the request, receiving an instruction from the first user indicating one or more documents of the plurality of documents for inclusion in the document collection;
   forming the document collection in accordance with the received instruction;
   making the document collection available to at least one additional user that includes a second user of the document management and collaboration system by at least identifying, based at least in part on a second attribute and a third attribute, a second correlation between the at least one additional user and the document collection, the second attribute associated with the at least one additional user, and the third attribute associated with a document in the document collection; and
   determining, based at least in part on the second attribute associated with the second user being a scheduling attribute, that the at least one document is available to be reviewed by the second user.

2. The computer-implemented method of claim 1, wherein the first attribute indicates that the plurality of documents are uploaded by the same party or the plurality of documents are uploaded within a specified time period.

3. The computer-implemented method of claim 1, wherein the first attribute indicates a correlation between a content of a first document of the plurality of documents and a content of a second document of the plurality of documents.

4. The computer-implemented method of claim 1, further comprising:
   receiving, from the user, a request to share the document collection with the one or more other users; and
   for each user of the one or more other users:
     determining whether an access privilege of the user permits access to the document collection; and
     on a condition that the access privilege does not permit access, sending an indication to an administrator of the document management and collaboration system of a failed request to share the document collection.

5. The computer-implemented method of claim 1, further comprising:
   receiving a request to access the document collection from a second user; and
   granting access to the document collection on a condition that an access privilege of the second user grants the second user access to an entirety of documents that form the document collection.

6. The computer-implemented method of claim 1, wherein identifying the plurality of documents is triggered due at least in part to the document being accessed by the user or uploaded by the user.

7. The computer-implemented method of claim 1, wherein the correlation further comprises a comparison among character maps of the plurality of documents.

8. A system, comprising a set of computing devices implementing at least a document management and collaboration system that causes the system to at least:
identify a first set of documents for inclusion in a document collection, the first set of documents being identified based at least in part on a first measure of relationship between a first attribute of the first set of documents and a second document, the attribute including at least a set of character maps associated with the first set of documents and the second document, the second document being part of the document collection or a candidate for inclusion in the document collection, the first measure of relationship is a correlation;
cause at least one first document of the first set of documents to be included in the document collection based at least in part on the first measure of the relationship between the first attribute of the first set of documents and the second document;
recommend the document collection to be made available to at least a subset of a set of users based at least in part on a second measure of relationship between the document collection and at least the subset of the set of users, the second measure of relationship determined based at least in part on a second attribute and a third attribute, the second attribute is associated with at least the subset of the set of users and the third attribute is associated with at least the first set of documents to be included in the document collection; and
determine, based at least in part on the second attribute associated with a recommended user of the subset of the set of users being a scheduling attribute, that the at least one first document is available to be reviewed by the recommended user of the subset of the set of users.

9. The system of claim 8, wherein the correlation is determined by at least correlating a first set of time attributes associated with the first set of documents and a second time attribute associated with the second document.

10. The system of claim 8, wherein the first measure of relationship is based at least in part on whether the first set of documents satisfy one or more document search criteria satisfied by the second document.

11. The system of claim 8, wherein the document management and collaboration system further causes the system to, prior to causing the at least one first document of the first set of documents to be included in the document collection:
transmit, to a user device, a request to confirm creation of the collection; and
receive a confirmation in response to the request.

12. The system of claim 8, wherein the document management and collaboration system further causes the system to detect whether a conflict exists between permission privileges of one or more documents in the document collection.

13. The system of claim 12, wherein the document management and collaboration system further causes the system to, on a condition that the conflict exists, provide an indication of the conflict to a user prior to making the collection available to one or more other users.

14. The system of claim 8, wherein:
the document management and collaboration system further causes the system to identify the first set of documents based at least in part on receiving a request to search at least one directory of the document management and collaboration system; and
the first set of documents satisfy one or more criteria of the request to search the at least one directory.

15. The system of claim 8, wherein the correlation is determined by at least comparing a subset of character maps of the set of character maps associated with the first set of documents and the second document.

16. A non-transitory computer-readable storage medium having collectively stored thereon executable instructions that, if executed by one or more processors of a computer system, cause the computer system to at least:
identify a set of documents for inclusion in a document collection based at least in part on a result of a first correlation applied to a first attribute associated with at least one document of the set of documents, the first attribute including a character map corresponding to the at least one document;
make the document collection available to a first user;
in response to making the document collection available, receive, from the first user, confirmation to create the document collection;
create the document collection including at least a subset of documents of the set of documents;
cause the document collection to be available to at least one additional user that includes a second user by at least generating a second correlation based at least in part on a second attribute and a third attribute, the second attribute is associated with at least the subset of documents of the set of documents and the third attribute is associated with the at least one additional user; and
recommend, based at least in part on the second attribute associated with the second user being a scheduling attribute, that the at least one document of the set of documents is available for review by the second user.

17. The non-transitory computer-readable storage medium of claim 16, wherein the first attribute associated with the at least one document include an identity of a user that uploaded the at least one document or viewed the document.

18. The non-transitory computer-readable storage medium of claim 16, wherein the character map assigns weights to characters and locations of the characters present in a content of the at least one document.

19. The non-transitory computer-readable storage medium of claim 18, wherein the weights are assigned based at least in part on a function of a frequency of an occurrence of particular characters in the at least one document and particular locations of characters in the at least one document.

20. The non-transitory computer-readable storage medium of claim 16, wherein the first attribute associated with the at least one document include a temporal attribute associated with the at least one document.

\* \* \* \* \*